US007605742B2

(12) United States Patent
Chuang et al.

(10) Patent No.: US 7,605,742 B2
(45) Date of Patent: Oct. 20, 2009

(54) FOLDABLE REMOTE CONTROLLER

(75) Inventors: Pai-Ko Chuang, Taipei Hsien (TW); Shih-Wen Su, Taipei Hsien (TW)

(73) Assignee: Wistron NeWeb Corp., Taipei Hsien (TW)

( * ) Notice: Subject to any disclaimer, the term of this patent is extended or adjusted under 35 U.S.C. 154(b) by 452 days.

(21) Appl. No.: 11/517,316

(22) Filed: Sep. 8, 2006

(65) Prior Publication Data

US 2008/0066121 A1 Mar. 13, 2008

(51) Int. Cl.
*H04L 17/02* (2006.01)

(52) U.S. Cl. ...................... 341/176; 455/419; 455/3.05; 482/4

(58) Field of Classification Search .................. 341/20, 341/173, 176; 482/4; 455/419, 3.05
See application file for complete search history.

(56) References Cited

U.S. PATENT DOCUMENTS

| | | | | |
|---|---|---|---|---|
| 6,094,156 | A | 7/2000 | Henty | |
| 7,058,356 | B2 * | 6/2006 | Slotznick | 455/3.05 |
| 7,155,213 | B1 * | 12/2006 | Almeda et al. | 455/419 |
| 7,229,385 | B2 * | 6/2007 | Freeman et al. | 482/4 |
| 2003/0027601 | A1 * | 2/2003 | Guo et al. | 455/566 |

FOREIGN PATENT DOCUMENTS

| | | |
|---|---|---|
| CN | 2517035 | 10/2002 |
| EP | 1 209 661 A1 | 5/2002 |
| EP | 1 271 286 A2 | 1/2003 |
| WO | WO-2004/107099 | 12/2004 |

* cited by examiner

*Primary Examiner*—Albert K Wong
(74) *Attorney, Agent, or Firm*—Muncy, Geissler, Olds & Lowe, PLLC

(57) ABSTRACT

A foldable remote controller is provided to remotely control a multimedia network device, transmit signals to the multimedia network device, and transmit or receive audio signals between the foldable remote controller and the multimedia network device, so as to communicate on the internet.

14 Claims, 4 Drawing Sheets

FOLDABLE REMOTE CONTROLLER

BACKGROUND

1. Field of Invention

The present invention relates to a foldable remote controller. More particularly, the present invention relates to a foldable remote controller for controlling a multimedia network device.

2. Description of Related Art

Rapid internet technological developments have made computer communication more convenient and faster. Therefore, communicating on the internet is becoming increasingly popular and important for both private and professional use.

Generally, a variety of electronic products, such as keyboard, microphone and speaker, are often used with several kinds of computer programs when talking or word chatting on the internet. As a result, electronic products for network communication have been rapidly developed to meet the growing needs. In the prior art, electronic products have improved for users. Improvements include wireless keyboards, wireless microphones and wireless speakers. These inventions enable for convenient communication via the internet. However, such products cannot save space to improve user convenience.

For the foregoing reasons, there is a need to solve problems with a multifunctional foldable remote controller with wireless keyboard, wireless microphone and wireless speaker functions. The device should be a remote controller to control multimedia network devices, so that space can be saved and users can improve the convenience when communicating on the internet.

SUMMARY

It is therefore an objective of the present invention to provide a foldable remote controller to let users communicate on the internet more easily and conveniently. Other objects and advantages of the present invention will be apparent to those of ordinary skill in the art having reference to the following specification together with its drawings.

In accordance with the foregoing objective of the present invention, an integrated foldable remote controller is provided. The foldable remote controller has an outer surface and an inner surface and comprises a microprocessor control unit, a wireless module, an signal emitter, an audio codec, a microphone, a speaker, a keyboard module, a function key module, and an open-close detector. The microprocessor control unit processes the data and transmits the data among elements in the foldable remote controller. The wireless module is coupled to the microprocessor control unit and used to convert wireless signals to data and the data to the wireless signals. The signal emitter is coupled to the wireless module and receives or transmits the wireless signals. The audio codec is also coupled to the wireless module and uses pulse code modulation (PCM) or adaptive differential pulse code modulation (ADPCM) for analog-to-digital and digital-to-analog conversion. The microphone and speaker are both coupled to the audio codec, converting a voice into the audio signals and converting the audio signals into a voice, respectively. The keyboard module and the function key module are both coupled to the microprocessor control unit, and provide users with the ability to input character data and a controlling signal into the multimedia network device, respectively. Besides, the open-close detector is coupled to the microprocessor control unit to detect if the foldable remote controller is open or closed.

In conclusion, the integrated foldable remote controller controls the multimedia network device with a remote control function. Also, the foldable remote controller transmits character signals into the multimedia network device, and receives and transmits the audio signals between the foldable remote controller and the multimedia network device, so as to let users communicate on the internet more easily and conveniently.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the preferred embodiment, with reference made to the accompanying drawings as follows.

DESCRIPTION OF THE PREFERRED EMBODIMENTS

Detailed illustrative embodiments of the present invention are disclosed herein. However, specific details disclosed herein are merely representative for purposes of describing exemplary embodiments of the present invention. This invention may, however, be embodied in many alternate forms and should not be construed as limited to the embodiments set forth herein.

The present invention provides a foldable remote controller to remotely control a multimedia network device, transmit character signals to the multimedia network device, and receives and transmits the audio signals between the foldable remote controller and the multimedia network device, so as to let users communicate on the internet more easily and conveniently.

Figure 1:
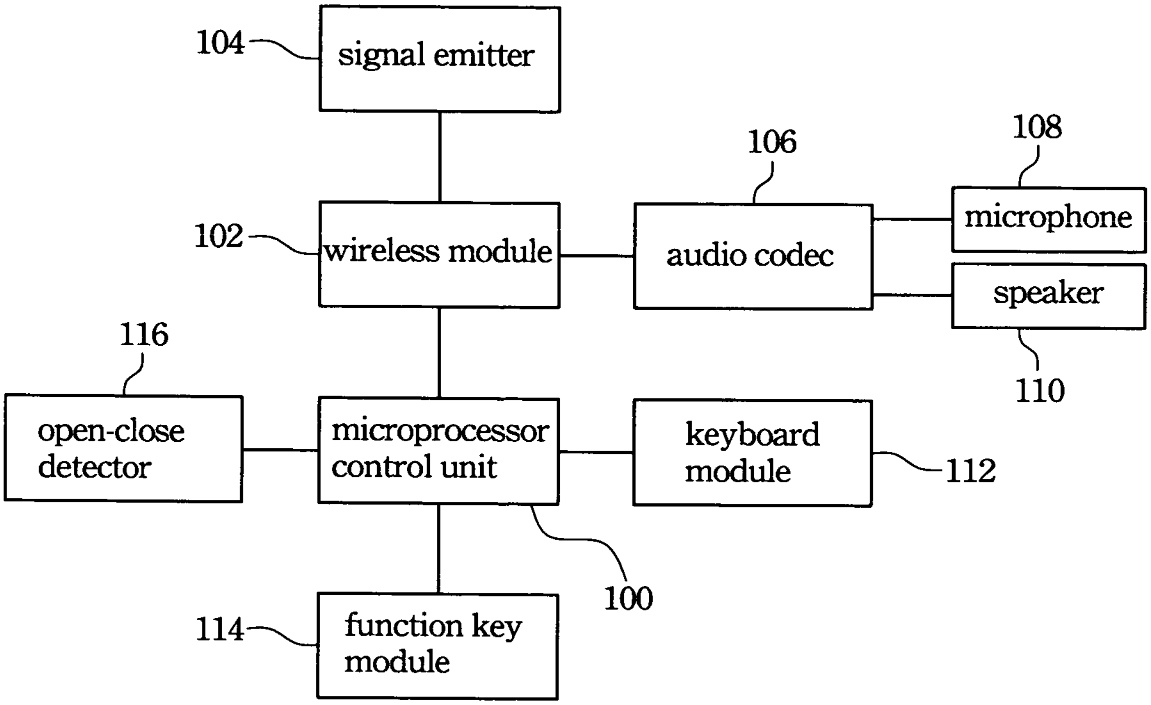
FIG. 1 is a block diagram of the main circuit structure according to one preferred embodiment of the present invention.

FIG. 1 is a block diagram of the main circuit structure according to one preferred embodiment of the present invention. The foldable remote controller includes a microprocessor control unit 100, a wireless module 102, an signal emitter 104, an audio codec 106, a microphone 108, a speaker 110, a keyboard module 112, a function key module 114, and an open-close detector 116. Referring to FIG. 1, the microprocessor control unit 100 is provided to process data and control the data transmission among elements in the foldable remote controller. The wireless module 102 is coupled to the microprocessor control unit 100 and converts signals into data and data into signals. And the wireless module 102 is selected from a group of wireless transmission modules consisting of bluetooth, infrared, near-field communication, ultra wide band, and IEEE 802.11 modules. The signal emitter 104 is coupled to the wireless module 102 and receives or transmits the wireless signals, wherein the signal emitter 104 can be an antenna. And the signal emitter 104 can also be a light emitting diode (LED) while the wireless module 102 is the infrared module. The audio codec 106 is also coupled to the wireless module 102 and uses pulse code modulation (PCM) or adaptive differential pulse code modulation(ADPCM) for analog-to-digital and digital-to-analog conversion.

Moreover, the microphone 108 is coupled to the audio codec 106 and converts a voice into audio signals that should be processed by the audio codec 106 and transmitted to the multimedia network device through the wireless module 102 and the signal emitter 104. The speaker 110 is also coupled to the audio codec 106. The audio signals transmitted from the multimedia network device are received through the signal emitter 104 and the wireless module 102, processed by the audio codec 106, and then converted into a voice by the speaker 110. The keyboard module 112 is coupled to the microprocessor control unit 100 and provides users with the ability to input character data into the multimedia network device. The function key module 114 is coupled to the microprocessor control unit 100 as well and provided to input a controlling signal into the multimedia network device to control the multimedia network device. Then, the open-close detector 116 is also coupled to the microprocessor control unit 100 and detects if the foldable remote controller is open or closed.

Figure 2:
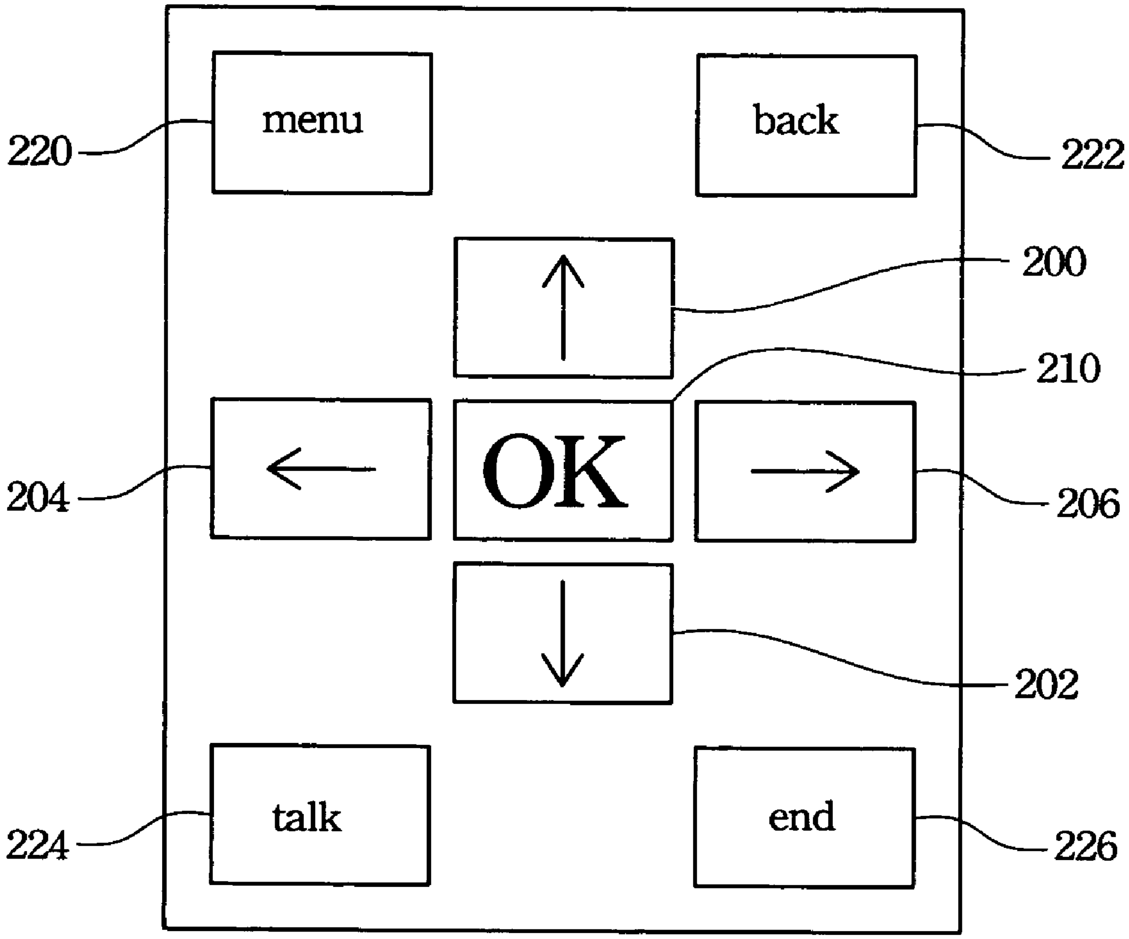
FIG. 2 is a vertical view of the outer appearance of the foldable remote controller according to one preferred embodiment of the present invention.

FIG. 2 is a vertical view of the outer appearance of the foldable remote controller according to one preferred embodiment of the present invention. According to the embodiment of the present invention, the foldable remote controller has an outer surface and an inner surface. The function key module 114, shown in FIG. 1, is used to remotely control the multimedia network device and is disposed on the outer surface of the foldable remote controller. The function key module 114 also includes a plurality of direction keys, a plurality of control keys, and a confirmation key. Referring to FIG. 2, the direction keys include an upward key 200, a downward key 202, a leftward key 204, and a rightward key 206. These keys are used to select different menus of the multimedia network device, wherein the upward key 200 and the downward key 202 are also used to control the volume of the multimedia network device, and the leftward key 204 and the rightward key 206 are also used to change the channels of the multimedia network device. The control keys include a menu key 220, a back key 222, a talk key 224, and an end key 226, wherein the menu key 220 is used to send an instruction to the multimedia network device to display the menu frame on the multimedia network device, and the back key 222 is used to go back to the last frame, and the talk key 224 and the end key 226 are used to accept and reject (or stop) the message session on the internet, respectively. The confirmation key 210 is used to confirm the choice of the menu of the multimedia network device. However, specific details disclosed about the foregoing amount and function of the keys is merely representative for purposes of describing exemplary embodiments of the present invention. This invention may be embodied in many alternate forms and should not be construed as limited to the embodiments set forth herein.

Figure 3A:
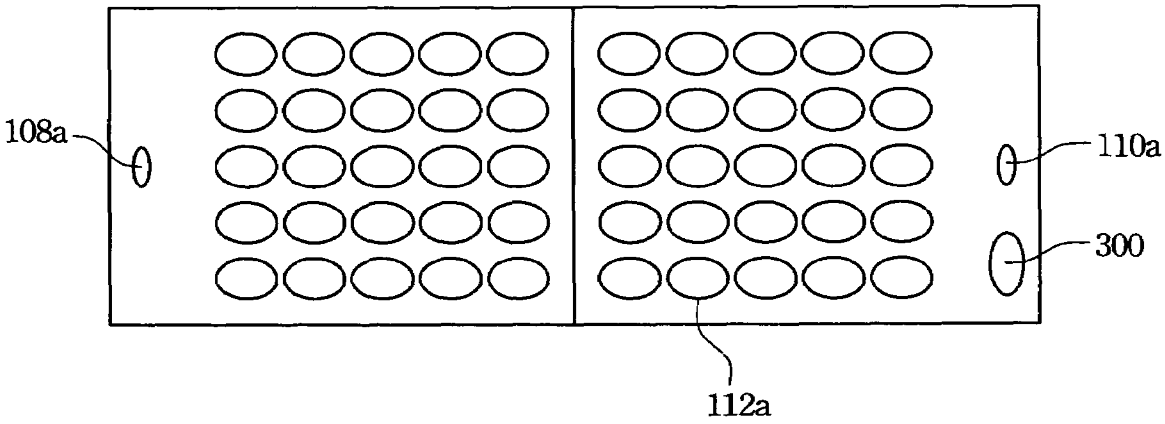
FIG. 3A is a schematic view showing the open foldable remote controller according to one preferred embodiment of the present invention.

FIG. 3A is a schematic view showing the open foldable remote controller according to one preferred embodiment of the present invention. Referring to FIG. 3A, the keyboard module 112*a* is disposed on the inner surface of the open foldable remote controller so that users can conveniently use the foldable remote controller after opening the foldable remote controller. The keyboard module 112*a* further includes a switch key 300 used to change the function of the foldable remote controller, so as to decide the foldable remote controller used to transmit the character signals to the multimedia network device or used to receive and transmit the audio signals between the foldable remote controller and the multimedia network device. Furthermore, the microphone 108*a* is disposed on a first part of the inner surface of the open foldable remote controller, and the speaker 110*a* is disposed on a second part of the inner surface of the open foldable remote controller.

Figure 3B:
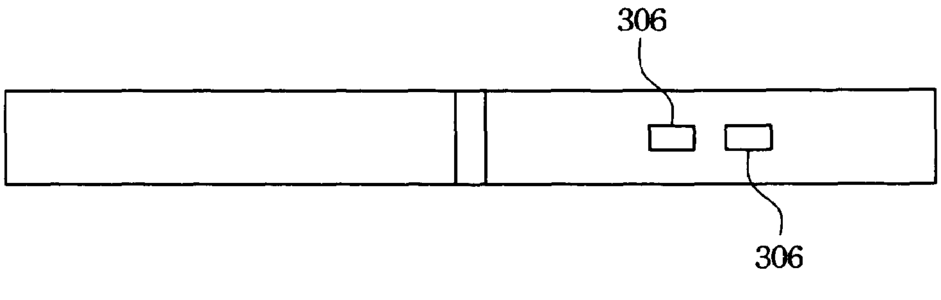
FIG. 3B is a lateral view of the open foldable remote controller according to one preferred embodiment of the present invention.

FIG. 3B is a lateral view of the open foldable remote controller according to one preferred embodiment of the present invention. Referring to FIG. 3B, the foldable remote controller further includes a group of auxiliary keys 306 on a lateral side of the foldable remote controller and used to adjust the volume of the foldable remote controller during the transmission of the audio signals between the foldable remote controller and the multimedia network device.

Figure 4:
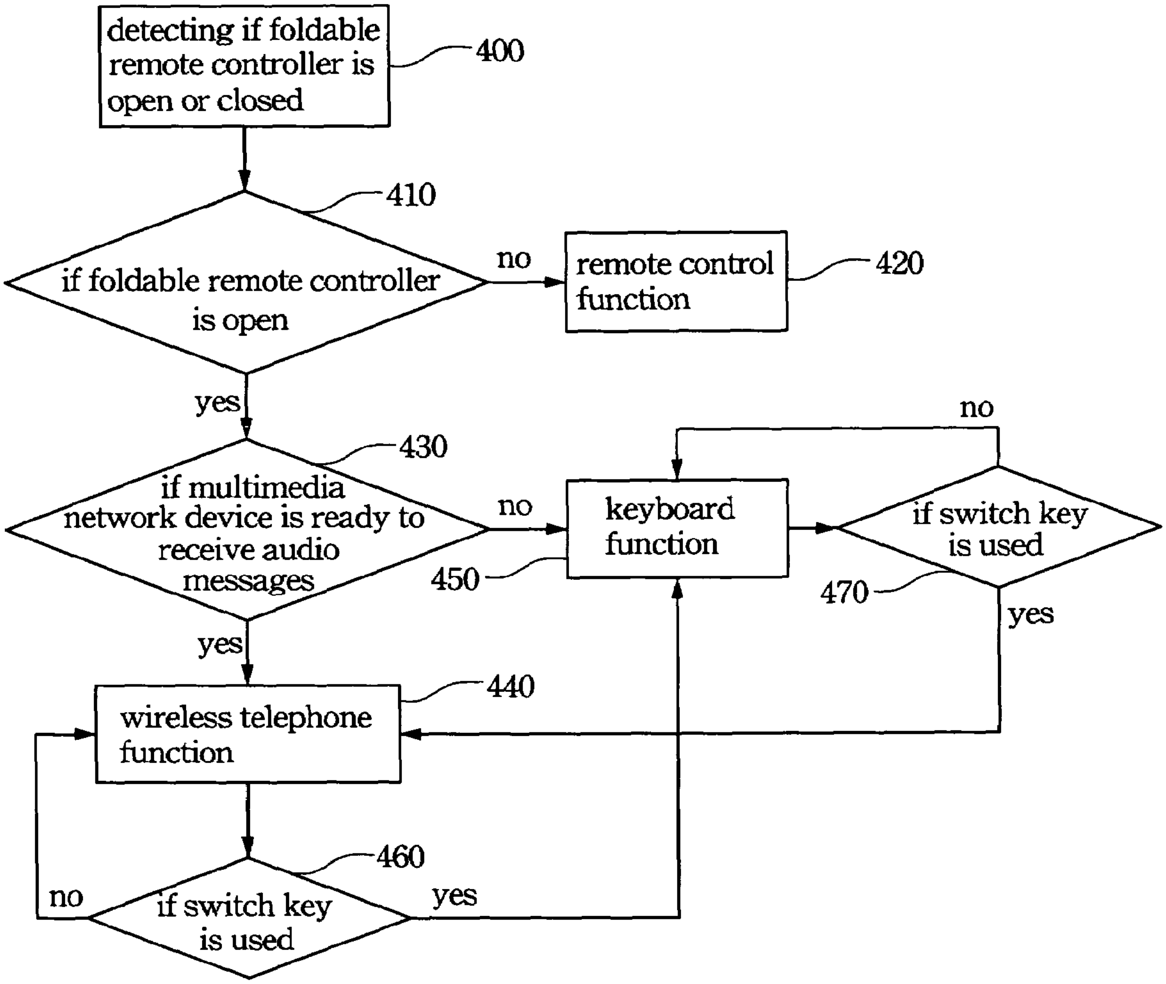
FIG. 4 is a flow chart showing how the function of the foldable remote controller is changed.

FIG. 4 is a flow chart showing how the function of the foldable remote controller is changed. Referring to FIG. 4, in the step 400, the open-close detector 116 detects if the foldable remote controller is open or closed, and sends a detection signal to the microprocessor control unit 100. In the step 410, the microprocessor control unit 100 checks if the foldable remote controller is open, in accordance with the detection signal. If the foldable remote controller is closed, it only has the remote control function 420. If the foldable remote controller is open, the next step 430 is executed, and the microprocessor control unit 100 executes the keyboard function 440 or the wireless telephone function 450 of the foldable remote controller.

In the step 430, the function of the foldable remote controller is decided by if the multimedia network device is in a condition of being ready to receive audio messages. If the multimedia network device is in the condition of being ready to receive the audio messages, the foldable remote controller receives a signal of the condition, and informs the microprocessor control unit 100 to execute the wireless telephone function 440 and receives the audio messages immediately, therefore the foldable remote controller receives and transmits the audio signals between the foldable remote controller and the multimedia network device. If the multimedia network device is in the condition of not being ready to receive messages, the foldable remote controller has the keyboard function 450 to let users transmit the character signals to the multimedia network device. Furthermore, when the foldable remote controller has the wireless telephone function 440, the switch key 300 disposed on the inner surface can be used to change the function in accordance with the step 460. If the switch key 300 is not used, the foldable remote controller has the original wireless telephone function 440. But if the switch key 300 is used, the foldable remote controller can be switched to have the keyboard function 450. Similarly, when the foldable remote controller has the keyboard function 450, the switch key 300 disposed on the inner surface can also be used to change the function in accordance with the step 470. If the switch key 300 is not used, the foldable remote controller has the original keyboard function 450. But if the switch key 300 is used, then the foldable remote controller can be switched to have the wireless telephone function 440.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A foldable remote controller having an outer surface and an inner surface, remotely controlling a multimedia network device, transmitting signals to the multimedia network device, and transmitting and receiving audio signals between the foldable remote controller and the multimedia network device, so as to communicate on internet, the foldable remote controller at least comprising:

a microprocessor control unit provided to process data and control the data transmission among elements in the foldable remote controller;

a wireless module coupled to the microprocessor control unit and used to convert wireless signals to data and the data to the wireless signals;

an signal emitter coupled to the wireless module and receiving or transmitting the wireless signals;

an audio codec coupled to the wireless module and used for analog-to-digital and digital-to-analog conversions;

a microphone coupled to the audio codec and converting voice into audio signals;

a speaker coupled to the audio codec and converting the audio signals into a voice;

a keyboard module coupled to the microprocessor control unit and provided for users to input character data into the multimedia network device;

a function key module coupled to the microprocessor control unit and provided for users to input a controlling signal into the multimedia network device, wherein the microprocessor control unit stops the keyboard function provided by the keyboard module and starts the remote control function provided by the function key module when the foldable remote controller is closed; and a open-close detector coupled to the microprocessor control unit and detecting if the foldable remote controller is open or closed.

2. The foldable remote controller of claim 1, wherein the wireless module is selected from a group of wireless transmission modules consisting of bluetooth, infrared, near-field communication, ultra wide band, and IEEE 802.11 modules.

3. The foldable remote controller of claim 2, wherein the signal emitter is a light emitting diode while the wireless module is the infrared module.

4. The foldable remote controller of claim 1, wherein the signal emitter is an antenna.

5. The foldable remote controller of claim 1, wherein the function key module is disposed on the outer surface of the foldable remote controller.

6. The foldable remote controller of claim 1, wherein the function key module further comprises:

a plurality of direction keys provided to select the different function menus, control the volume, and change the channels of the multimedia network device;

a confirmation key provided to confirm the choice of the menu of the multimedia network device; and a plurality of control keys provided to transmit an instruction to the multimedia network device, change the different menus of the multimedia network device, and control the multimedia network device to start or end communicating on the internet.

7. The foldable remote controller of claim 1, wherein the keyboard module is disposed on inner side of the foldable remote controller.

8. The foldable remote controller of claim 1, wherein the keyboard module further includes a switch key provided to input commands to control the foldable remote controller to transmit the character signals to the multimedia network device, and receive and transmit the audio signals between the foldable remote controller and the multimedia network device.

9. The foldable remote controller of claim 1, wherein the microphone is disposed on a first part of the inner surface of the open foldable remote controller, and the speaker is disposed on a second part of the inner surface of the open foldable remote controller.

10. The foldable remote controller of claim 1, wherein the foldable remote controller further includes a group of auxiliary keys on a lateral side of the foldable remote controller and is provided to adjust the volume of the foldable remote controller during receiving and transmitting the audio signals between the foldable remote controller and the multimedia network device.

11. The foldable remote controller of claim 1, wherein the open-close detector further transmits a detection signal to the microprocessor control unit, and the microprocessor control unit determines the function of the foldable remote controller according to the detection signal.

12. The foldable remote controller of claim 11, wherein the microprocessor control unit executes the keyboard or the wireless telephone function when the foldable remote controller is unfolded.

13. The foldable remote controller of claim 12, wherein the foldable remote controller has the wireless telephone function when the multimedia network device is in a condition of being ready to receive audio messages, and the foldable remote controller has the keyboard function when the multimedia network device is changed to be in a condition of not being ready to receive the audio messages.

14. The foldable remote controller of claim 12, further comprising a switch disposed on the inner surface, wherein the switch changes the keyboard and the wireless telephone function of the foldable remote controller.

* * * * *